United States Patent [19]
Gelbrich

[11] 3,760,914
[45] Sept. 25, 1973

[54] ROLLER TYPE FREEWHEEL CLUTCH
[75] Inventor: Werner W. Gelbrich, Heidelberg, Germany
[73] Assignee: Borg-Warner-Stieber GmbH, Heidelberg, Germany
[22] Filed: Mar. 24, 1972
[21] Appl. No.: 237,838

[30] Foreign Application Priority Data
Apr. 1, 1971 Germany.......................... 7112604

[52] U.S. Cl. ................................................ 192/45
[51] Int. Cl............................................ F16d 41/07
[58] Field of Search..................... 192/45; 188/82.84

[56] References Cited
UNITED STATES PATENTS
3,260,333   7/1966  Benson et al. .................... 192/45
2,371,653   3/1945  Schuckers........................... 192/45
2,633,951   4/1953  Ayer et al. ......................... 192/45
2,835,363   5/1958  Long................................... 192/45
3,031,052   4/1962  Blinder .............................. 192/45
3,031,053   4/1962  Sauzedde et al. ................. 192/45
3,087,588   4/1963  Fischer .............................. 192/45
3,500,977   3/1970  Gehrke ............................... 192/45
3,691,854   9/1972  Barthruff et al. .................. 192/45

Primary Examiner—Allan D. Herrmann
Attorney—Donald W. Banner et al.

[57] ABSTRACT

A wedging roller free wheeling device includes a two piece plastic cage, the cage members being assembled with a cammed race and secured in position to form a subassembly. The cage includes pockets for a number of pleated energizing springs and rollers, each pocket is provided with a shoulder arranged to prevent radial separation of the roller from the cage. The subassembly can be preassembled for later combination with a cylindrical race to form a free wheeling clutch.

3 Claims, 7 Drawing Figures

ROLLER TYPE FREEWHEEL CLUTCH

SUMMARY OF THE INVENTION

The innovation relates to a grip roller overrunning clutch, consisting in the usual way of an outer ring with a cylindrical gripping surface, lying in the inside, an inner star with socketed gripping surfaces extending wedge-like in relation to the cylindrical gripping surface, and a cage in which grip rollers are guided between the gripping surfaces of the outer ring and each socketed gripping surface of the inner star, and are individually spring biased in the direction of clutching, i.e., in the direction of gripping, by compression springs. Up to the present, this spring biasing is effected either through compression springs, set into suitable bores by bolts, or by a single leaf flexible spring. The first solution has the disadvantage of a comparatively expensive product and further of a relatively difficult mounting; the latter mentioned solution does not permit alteration of the elasticity of the spring over a relatively wide range, and adaptation thereby for this case of application.

It is the task of the innovation to create a design for a grip-roller-overrunning clutch, uniting the advantages of both above described structures, avoiding, however, the disadvantages of this construction which exist up to the present.

This task is solved according to the innovation by the combination of a number of features a part of which are already known by themselves. The solution according to the invention is characterized in that the cage is centered in a way which is already known by itself, by pushing its side-plates on to the inner star, and secured against shifting in axial and circumferential directions, the cage having, adjacent each socketed gripping surface, a cavity being of a parti-annular shape for the reception of a pleated spring, the bending planes of which run either radially or substantially axially to the centerline of the clutch and each roller-receiving pocket of the cage being provided on its side, placed opposite to the bending spring, on its end extending radially at the outside, with a shoulder, directed toward the roller. Such a cage can be made in a known manner by injection molding from a plastic material. It can be assembled in a specially appropriate way from a part comprising a sideplate and the pockets receiving the grip rollers and a sideplate which is firmly connected with it.

A special advantage of the grip roller-overrunning clutch according to the innovation is its ease of manufacture. Under application of pleated springs, it is possible to do without spring bolts; the need of making bores in the cage is equally superfluous, since their shape results from the circular cylindrical residual surfaces, remaining between the socketed gripping surfaces on the inner star and the oppositely placed inner surfaces of the cage, having equally the shape of circular cylinders. Due to the shape of the cage, and the favorable constant thickness of the wall, reached by the technique of injection molding; the shape of these cavities receiving the spring is not only easily manufactured in every single case, but it offers a good lead and shock absorption for the flexible springs.

The grip-roller overrunning clutch has also the advantage that the grip-rollers are retained in the receiving pocket by the shoulders provided in the pockets. This facilitates on one hand, the assembly of the overrunning clutch and enables, on the other hand, the application of the grip-roller overrunning clutch as a built-up subassembly without an outer ring. Such cases of applications are relatively frequent; the subassembly is assembled with the gears, pulleys or the like providing an outer ring. Each grip-roller can be assembled from the outside of the cage and of the inner star, while, in a known solution, where the cage-windows are bent toward each other on their outer edges for forming a smaller window-opening in comparison with the diameter of the grip-roller in the direction of the cage, and the installation can be effected only by an axial introduction and a subsequent placing of pronged rings or the like for axial retention. In the solution according to the innovation, on the other hand, the axial securing can be effected on the cage itself, since the introduction of the grip-rollers, as already mentioned, can be effected radially from the outside toward the inside.

The embodiment described above as especially appropriate for the purpose of the innovation, in which the cage is composed of a part consisting of a side-plate and pockets receiving the grip-rollers and of a side-plate firmly connected with it, has further even the special advantage that various widths of cage can be produced in a simple manner. The complicated inner frontpart remains namely unchanged thereby and merely the axial length of the cage is changed which can be realized in a very simple way by a divided form, without introducing high cost in its production.

DESCRIPTION OF THE PREFERRED EMBODIMENT

Figure 1:
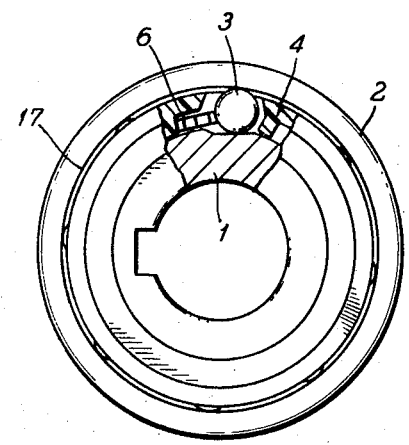
FIG. 1 is a frontal view of a complete overrunning clutch having an outer race including a fragmentary section taken through a roller receiving pocket.

Between the inner gripping star 1 and the outer ring 2 there are grip rollers 3 which are introduced into a cage, both parts of which are marked by 4 and 5. In the cage 4, 5 there are pleated springs 6, serving for the suspension of the grip-rollers in the clutching direction, i.e., in the direction of gripping.

Figure 7:
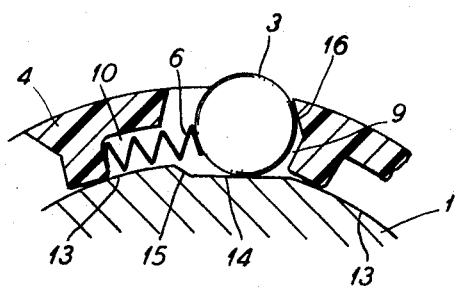
FIG. 7 is an enlarged section view showing a roller receiving pocket with a roller and spring.

Further details are to be seen in FIGS. 3 to 7. The part of the cage illustrated in FIGS. 3 and 4, marked in its total by 4, is composed of a cover plate 7 and of a circumferential part 8. This part of the cage 4 forms — together with the inner star 1 — the receiving pockets 9 for the grip-rollers and the shape of an annular space having cavities 10 for the reception of springs for the grip-rollers. More precise details of these cavities and the pockets receiving the grip-rollers are illustrated in FIG. 7. The cage-part 4 has besides several axially running pegs 11 serving for the connection with the part represented in FIGS. 5 and 6. By changing the length of the peripheral section 8 of the cage-part 4, various widths of cage (and thereby lengths of grip-rollers) can be realized whereby the maximum torque which can be held by the grip-roller overrunning clutch can be changed.

Figure 4:
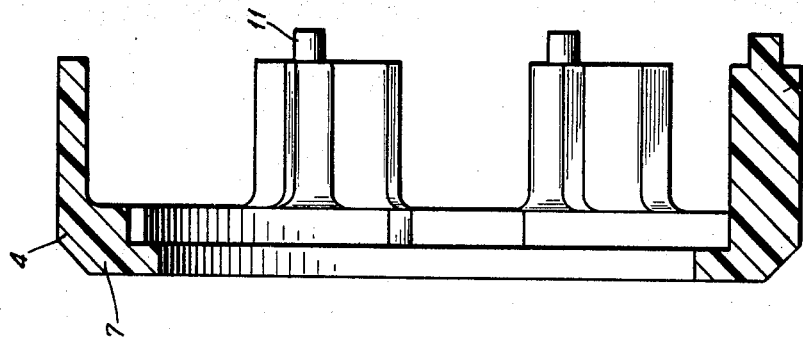
FIG. 4 is a section view taken along the line IV — IV of FIG. 3.
Figure 3:
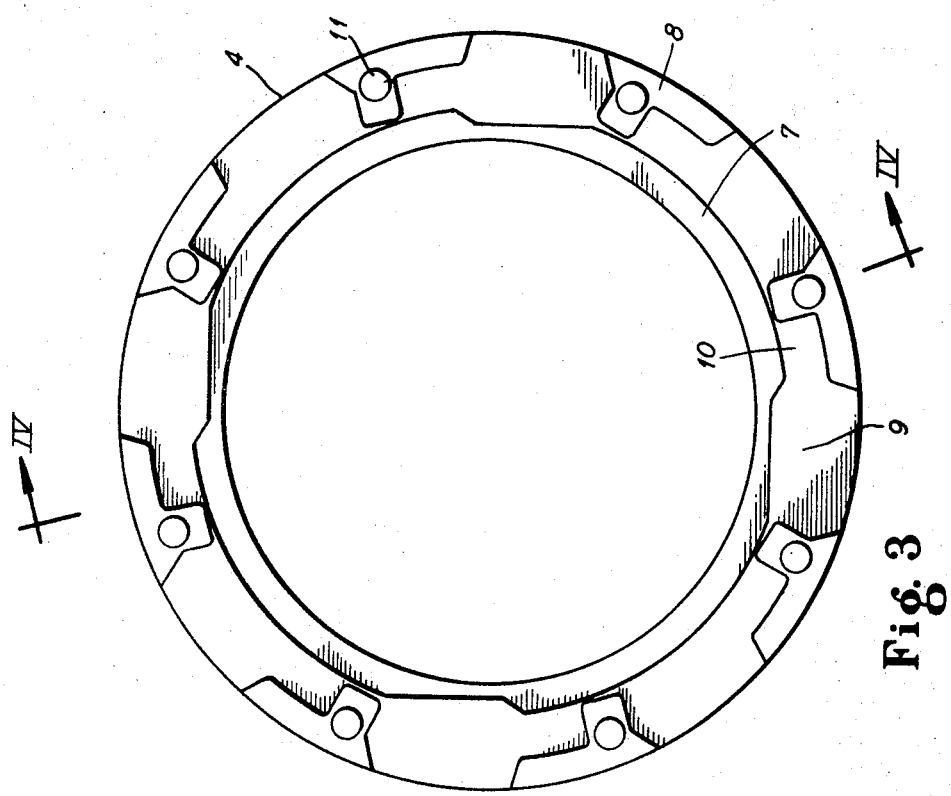
FIG. 3 is a frontal view of the part of the cage of the grip roller overrunning clutch according to the innovation, comprising a side plate and the roller receiving pockets.
Figure 6:
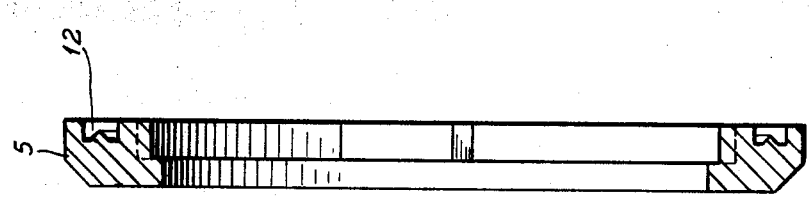
FIG. 6 is a section view of the side plate to be connected to the cage part shown in FIGS. 3 and 4.
Figure 5:
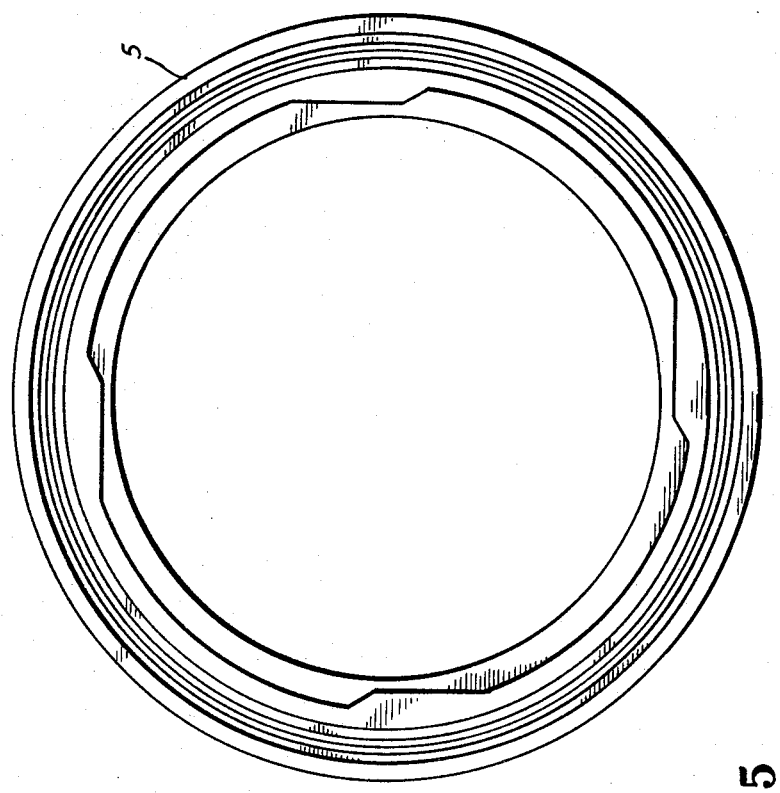
FIG. 5 is a frontal view.

FIGS. 5 and 6, represent the part of the cage 5 serving as side-plate or cover for the cage-part 4 according to FIGS. 3 and 4. This cage-part like the cage-part 4 has at least at several places on its inside, precisely the profile of the inner star 1, so that these parts of the cage can be pushed upon the inner star and can thus be nonrotatively connected with the inner star 1. The cover part 5 of the cage comprises outwardly closed openings 12, serving for the reception of the extending pegs 11 of the cage-part 4 and for the firm connection by any art and manner between parts 4 and 5, for example, by pressed fit, by glueing, by thermal bonding, or any other suitable manner.

As shown in FIG. 7, there are pleated leaf springs 6 in the cavities 10, having the shape of annular surface, for the suspension of the grip-rollers 3, sitting in the pockets 9 of the cage-part 4. The centering of the cage in respect to the inner star 1 is effected by the side-plate on the parti-cylindrical surfaces 13, while assurance against turning is provided by the counter grip-surfaces 14 and on their shoulders 15.

The receiving pocket 9 of the grip-rollers has on its side opposite to the flexible spring 6, placed on the radially lying outer end, a shoulder 16, extending toward the grip-roller 3, preventing the grip-roller 3 from being pushed out from the roller receiving pocket 9 in the absence of an outer ring. The cylindrical, inner, gripping surface of the outer ring 2 is marked by 17 in FIGS. 1 and 2. The condition of the overrunning clutch without an outer ring is shown in FIG. 7 where the grip-roller 3 rests against the shoulder 16.

The cavity 10 for receiving the pleated spring 6 has the shape of an annular space, i.e., its inner and outer surfaces are concentric with the centerline of the cage-part 4, and thereby with the centerline of the inner star 1.

Figure 2:
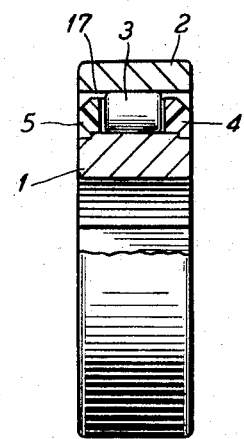
FIG. 2 is a section view through the grip roller overrunning clutch of FIG. 1.

In the embodiment shown in FIG. 7, the folding planes of the pleated springs 6 run substantially radially to the centerline of the clutch, however, a form of embodiment is just as well possible which has these folding planes substantially axially to the centerline of the clutch. This form of embodiment is illustrated in FIG. 1.

I claim:

1. A grip roller overrunning clutch, comprising an outer ring having a cylindrical gripping surface located on the inside thereof, an inner star having countergripping surfaces extending wedge-like toward said cylindrical gripping surface, and a cage having grip rollers disposed between said gripping surface of said outer ring and each countergripping surface of said inner star, each of said grip rollers being individually suspended in its coupling direction by a compression spring, said cage including a pair of side plates mounted on said star having an inner profile corresponding with the profile of said inner star disposed for centering said cage with respect to said star, and arranged for engagement with said countergripping surfaces for securing said cage against circumferential displacement with respect to said star, said side plates securing said cage against axial displacement with respect to said star, said cage including a parti-annular cavity portion adjacent each of said countergripping surfaces for receiving a pleated leaf spring, said cage further including a roller receiving pocket circumferentially adjacent each of said parti-annular cavity portions, said pocket including a shoulder disposed radially outwardly and remote from said spring, said shoulder extending from a wall of said pocket toward said roller.

2. A grip roller overrunning clutch according to claim 1 in which said cage is formed from an injection molded plastic.

3. A grip roller overruning clutch according to claim 2 wherein said cage is assembled from a part including a first side plate having a circumferential part extending therefrom defining said spring receiving cavity portions and said roller receiving pockets and a second side plate firmly connected to and axially spaced from said first side plate.

* * * * *